(12) United States Patent
Wiedenmann

(10) Patent No.: US 6,738,422 B2
(45) Date of Patent: May 18, 2004

(54) VIDEO SIGNAL MULTIPLEXATION APPARATUS

(75) Inventor: Henrike D. Wiedenmann, Munich (DE)

(73) Assignee: Earth View Television & Datatransfer GmbH, Munich (DE)

( * ) Notice: Subject to any disclaimer, the term of this patent is extended or adjusted under 35 U.S.C. 154(b) by 0 days.

(21) Appl. No.: 09/449,394

(22) Filed: Nov. 26, 1999

(65) Prior Publication Data

US 2002/0018522 A1 Feb. 14, 2002

Related U.S. Application Data

(63) Continuation of application No. PCT/EP98/01794, filed on Mar. 26, 1998.

(51) Int. Cl.⁷ .................................................. H04N 7/12
(52) U.S. Cl. .............................. 375/240.01; 375/240.12
(58) Field of Search .................................... 348/384, 385, 348/387, 388, 157, 419, 13, 8, 257, 388.1; 375/240.12, 240.01; 370/397; 386/92; 455/12.1; 725/151

(56) References Cited

U.S. PATENT DOCUMENTS

| | | | | |
|---|---|---|---|---|
| 3,882,538 A | * | 5/1975 | Lowe | 386/92 |
| 4,757,386 A | * | 7/1988 | Sanner | 348/257 |
| 5,115,309 A | * | 5/1992 | Hang | 348/388.1 |
| 5,202,886 A | | 4/1993 | Rossi et al. | 370/112 |
| 5,371,535 A | | 12/1994 | Takizawa | 348/15 |
| 5,509,013 A | | 4/1996 | Adachi et al. | 370/84 |
| 5,517,236 A | | 5/1996 | Sergeant et al. | 348/143 |
| 5,524,272 A | * | 6/1996 | Podowski et al. | 455/3.2 |
| 5,583,562 A | | 12/1996 | Birch et al. | 348/12 |
| 5,583,863 A | * | 12/1996 | Darr, Jr. et al. | 370/397 |
| 5,606,369 A | | 2/1997 | Keesman et al. | 348/385 |
| 5,745,167 A | | 4/1998 | Kageyu et al. | 348/153 |
| 5,790,177 A | * | 8/1998 | Kassatly | 348/13 |
| 5,956,081 A | * | 9/1999 | Katz et al. | 348/163 |
| 5,995,140 A | * | 11/1999 | Cooper et al. | 348/159 |
| 6,047,162 A | * | 4/2000 | Lazaris-Brunner et al. | 455/12.1 |

\* cited by examiner

Primary Examiner—Chris Kelley
Assistant Examiner—Allen Wong
(74) Attorney, Agent, or Firm—Fitch, Even, Tabin & Flannery

(57) ABSTRACT

The invention relates to a device (1) for generating a video signal of a quality corresponding to a generating bit rate (x). Said device comprises: a receiving level (4) having a plurality (n) of receiving inputs (2) for the simultaneous reception of different image signals ($Y_i$) at least one of which has a receiving bit rate ($y_i$) which is lower than generating bit rate (x); a memory level (5) for the intermediate storage of the received image signals ($Y_i$); and a data retrieval level (8) for reading out the image signals ($Y_i$) in intermediate storage by means of the generating bit rate (x) and for generating the video signal which is composed of successive time segments of the different image signals ($Y_i$). The invention also relates to an image signal source for coupling with the above device.

34 Claims, 3 Drawing Sheets

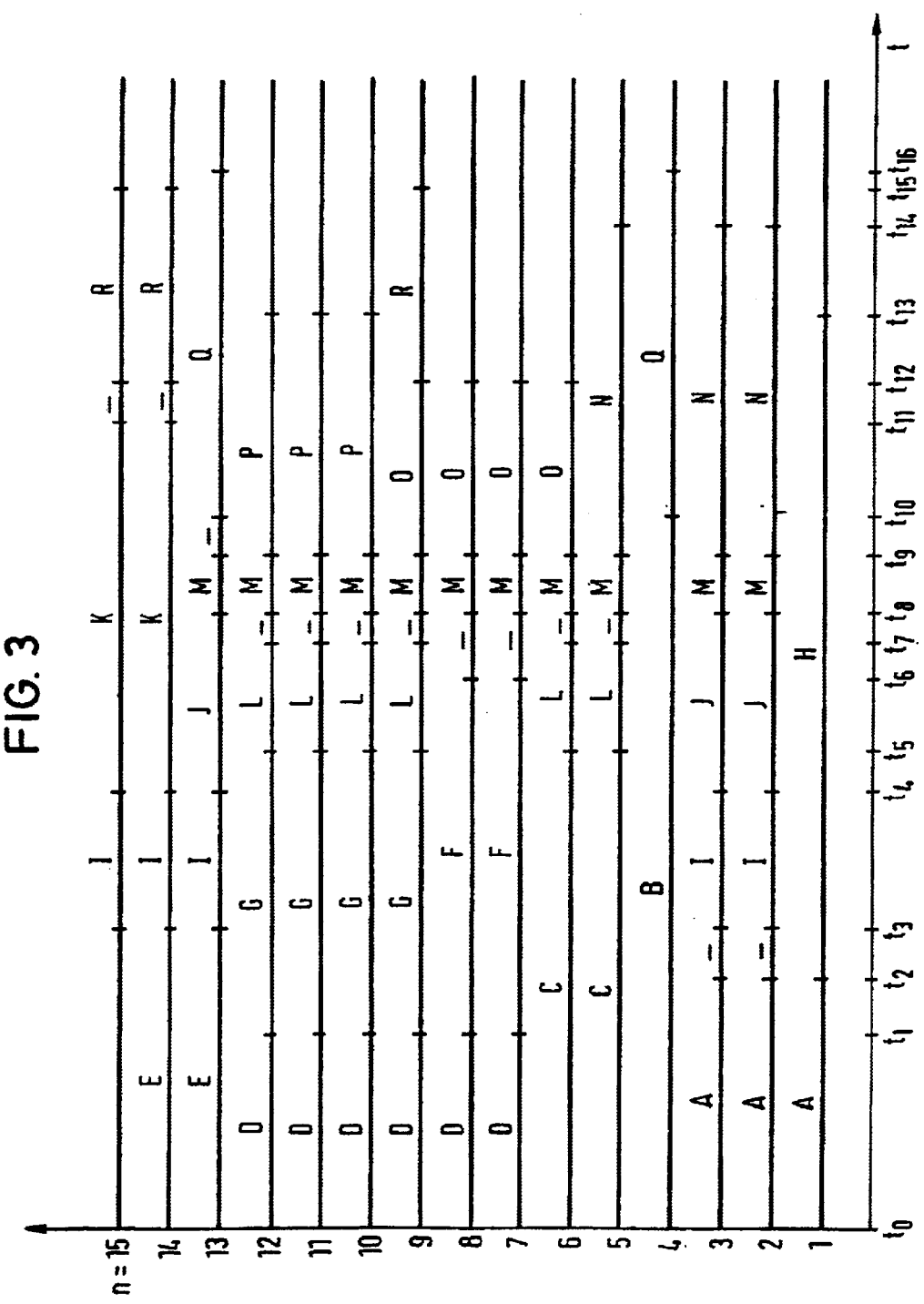

VIDEO SIGNAL MULTIPLEXATION APPARATUS

Figure 1:
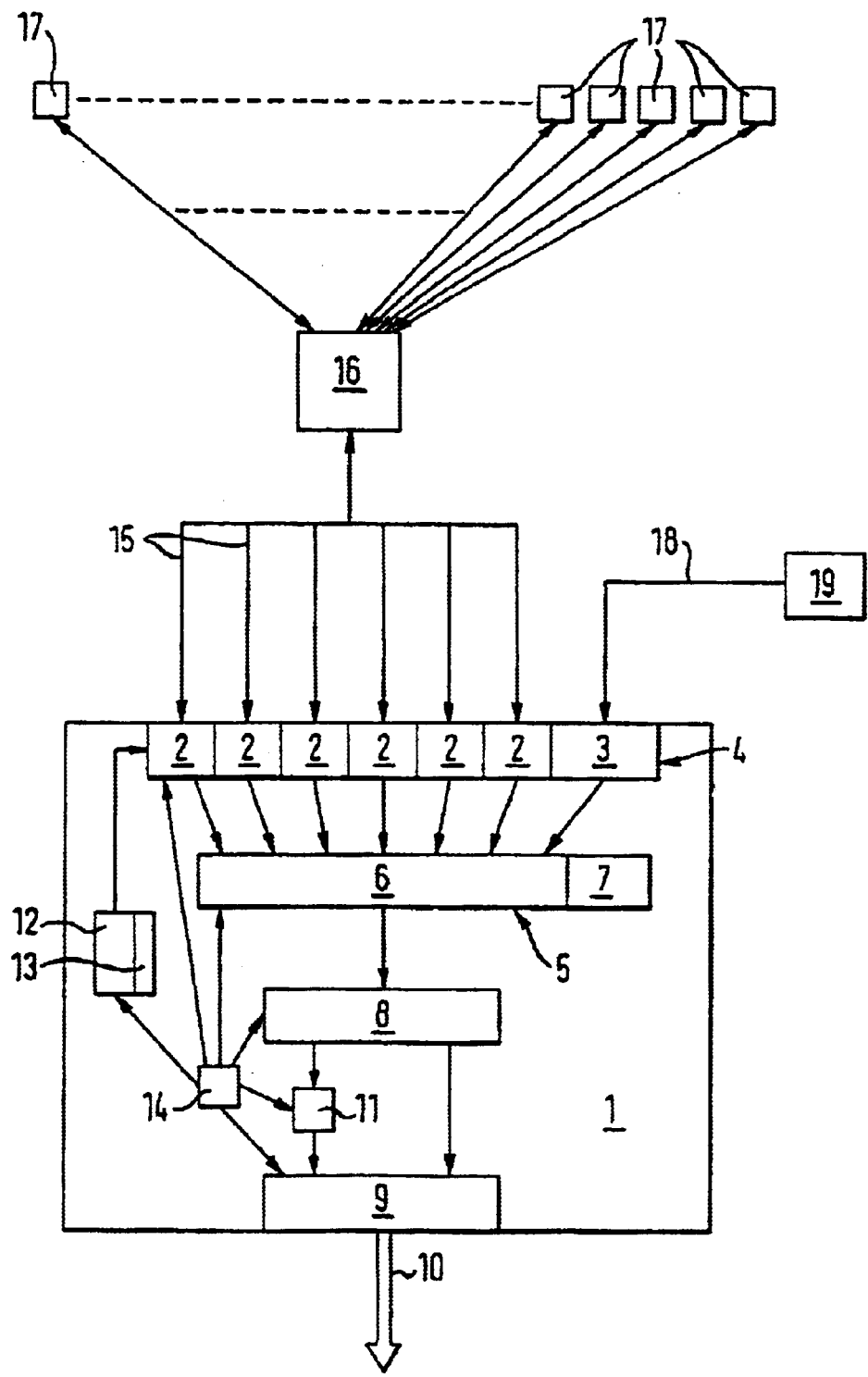

This is a continuation, of prior application No. PCT/EP98/01794, filed Mar. 26, 1998, designating the United States of America which is hereby incorporated herein by reference in its entirety. The entire disclosure of the prior application, from which a copy of the oath or declaration is supplied under paragraph 3 below, is considered as being part of the disclosure of the accompanying application, and is hereby incorporated by reference therein.

The invention relates to an apparatus for the generation of a video signal of a quality corresponding to a generating bit rate x.

With such apparatuses, video signals are produced which are composed, for example, of a plurality of sequential image signals which directly follow one another time-wise, with Fe individual image signals being recorded at different geographical locations in order to be transmitted with the smallest possible time delay. This principle as, for example, used in order to put together live weather information from various geographical locations, with the corresponding video signal consisting of cyclically alternating image signals which are respectively recorded at different geographical locations by means of a camera. These image signals are then cut together in a transmission center in order to obtain the video signal that is to be generated in this manner. In accordance with the known principle, the transmission of the image sequences to the transmitting center takes place at least over part of the path by directional radio, cable or satellite. The image signals received from the transmitting center are in this case broadcast at once, i.e. live, as individual part segments of the generated video signal.

The known principle has the disadvantage that when using a directional radio transmission path only relatively short distances between the camera and the transmitting center can be bridged at reasonable cost. This disadvantage can indeed by overcome by the use of a cable or satellite transmission. However, the costs associated therewith are very high, so that, for example, the transmission of image signals from different locations of the earth to a unitary transmission center is not possible with economically sensible cost and complexity.

An object of the invention is to make available an apparatus of the initially named kind which makes it possible, at reasonable economic cost, to receive image signals recorded at different locations far apart from one another and to broadcast them as close as possible time-wise, i.e. with the least possible delay, as elements of a video signal.

In accordance with the invention this object is satisfied by an apparatus for the generation of a video signal of a quality corresponding to a generating bit rate x comprising a receiver stage having a plurality n of receiving inputs for the simultaneous reception of different image signals $Y_i$, at least one of which has a receiving bit rate $y_i$ lower than the generating bit rate x, a storage stage for the intermediate storage of the received image signals $Y_i$, and a data retrieval stage for the reading out of the intermediately stored image signals $Y_i$ which takes place with the generating bit rate x and for the generation of the video signal which is composed of successive time segments of the different image signals $Y_i$.

Thus, in accordance with the invention, the speed of transmission with which at least one and preferably a plurality or all image signals are received is smaller than the transmission speed with which the video signal composed of the image signals is transmitted. In order to enable the continuous transmission of the video signal, at high quality or at high transmission speed, despite this speed difference, a plurality of the individual image signals are in each case received simultaneously by the apparatus of the invention, with—as mentioned—the transmission speed of at least one of the received image signals being smaller than the speed of transmission of the video signal composed of the image signals. The reception of the image signals thus preferably takes place offset with time overlap, which will be explained further in the context of the description of the drawings.

An advantage of the apparatus of the invention is consequently to be seen in the fact that the transmission of the different image signals from image signal sources at different geographical locations to an apparatus in accordance with the invention used as a transmission center can take place at a lower data rate. As a result of the reduced speed of transmission already existing transmission paths or data lines with a comparatively low capacity, which are not normally suitable for the transmission of video signals can be used, which enables an image signal transmission over very large distances at comparatively low costs. The construction of new networks and transmission paths is thus not absolutely essential. In particular it is possible, in accordance with the invention, to return to existing selection line networks, such as telephone networks or Internet, in which an intentional dialing in and out can take place, which in turn has the consequence that a line is only used, and only has to be paid for, during those time intervals in which it is actually required.

Despite the slow transmission, it is possible to endow the generated video signal with a live character in accordance with the invention in that one ensures that an image signal fully received by the center at low speed is transmitted directly after, or with only a small time delay after, full reception as an element of the video signal. If the video signal consists exclusively of time segments, which only have a duration of a few minutes or less, then it can be ensured with the apparatus of the invention that the image signals received from the center are transmitted, only a few minutes after their recording by the image signal sources, as a component of the video signal. When producing a video signal which is, for example, intended to transmit weather information from different locations, a delay of this kind of a few minutes is straightforwardly acceptable, since this delay does not negatively impair the live character of the video signal in any way.

At this point it should be noted that the terms video signal and image signal which are used for the explanation of the invention basically also include such signals as additionally contain sound and/or text information in addition to the image or video information.

It is preferably the case, when so many receiving inputs are made available, that the sum of the reception bit rates of the simultaneously received image signals is greater than or the same as the generating bit rate x. In this way it is ensured that adequate image signals are always available for the production of a continuous video signal of high quality.

Receiving bit rates which differ from one another can be associated with different receiving inputs, for example, if more powerful lines exist for specific image signal sources or geographical locations than for other image signal sources.

It is also possible to make available at least one additional receiving input which can, for example, come into use when disturbances occur in the system, i.e. in the image signal sources, on the transmission paths and/or in the center. In the case of such disturbances an additional receiving input can, for example, be operated with an increased reception bit rate, in particular with the generating bit rate x, in order in this manner to receive a signal which can be transmitted directly—without intermediate storage and without time delay—as a video signal, so long as the disturbance in the system has not been remedied. It is particularly preferred when the additional receiving input is coupled via a dedicated line to an image signal source, so that when required a changeover can be made at any time to the image signal received via the additional receiving input at short notice.

In the receiving stage a plurality of receiving inputs can be switched together to a group for the reception of an individual image signal. A group of this kind can include two or more receiving inputs, and in an extreme case all the available receiving inputs. The data of an individual image signal can then be transmitted in parallel via such a group, which leads to a more rapid transmission of the image signal in comparison to the use of a single receiving input for an image signal.

It is particularly preferred when the numbers of the receiving inputs which are in each case switched together to a group for the transmission of the individual image signals differ from one another and are adaptable to the respectively existing transmission capacities and/or demands. In this manner account can also be taken, in addition to the different demands as specified by the respective user, of the circumstance that different transmission characteristics are, as a rule, available for the transmission of signals between the image signal sources present at different locations and the center. Then it is also possible to make available precisely so many receiving inputs for the reception of an individual image signal that the respectively available transmission capacities are fully exploited. For the transmission of image signals over distances with a high transmission capacity, a plurality of receiving inputs can therefore be simultaneously used, whereas, for the transmission of an image signal over a path with a very low transmission capacity, it is, for example, only necessary to make available a single receiving input. In this respect account is to be taken of the fact that the different receiving inputs can also be operated with mutually differing transmission capacities, i.e. bit rates.

If a plurality of image signals are stored in specific applications in one image signal source, then these can also be transmitted in parallel, i.e. simultaneously, to the center if appropriate transmission capacity is available.

It is particularly advantageous when the number of receiving inputs which are switched together to a group for the transmission of an individual image signal is variable timewise and adaptable to the transmission capacities present at a respective point in time. In this way account can be taken of a circumstance in which a lower transmission capacity is available at certain points in time, for example as a result of disturbed transmission lines, than with fully functioning transmission lines. The receiving inputs which are not exploited for the transmission of the respective image signal with reduced transmission capacity can then be exploited in advantageous manner, during the defect of the respective transmission line, for the transmission of other image signals. Thus, an ideal exploitation of all receiving inputs that are available is always ensured.

The above explained principle for the utilization of in each case a group of receiving inputs for the reception of the individual image signals will be explained in more detail in the context of the specific description with reference to FIG. 3.

The transmitter stage provided in accordance with the invention can be formed for the transmission by wire or wireless of a digital video signal or of an analogue video signal obtained from a digital video signal.

It is advantageous when the n receiving inputs can be connected to selection lines and/or direct lines, since in this manner one can turn to an already existing transmission network which can, moreover, be exploited at relatively low costs. One or more of the receiving inputs can be connected to direct lines, whereby one can ensure that at least certain image signals can also be received when selection lines are temporarily not available, for example because of overloading. The transmission capacity of the direct lines can in this respect be the same as or larger than the transmission capacity of the selection lines.

Fundamentally lines can be used which are operated in accordance with a customary protocol, such as for example in accordance with an ISDN, VN3, DSS1, 1TR6, TPH, DASS2, 4ESS, 5ESS, DMS/250, DMS/100 and/or NTT (INS1500) protocol.

In a practical application of the apparatus of the invention 60 receiving inputs are, for example, provided which are respectively connectable to an ISDN data line (B-channel).

The image signals are preferably received in compressed form via the receiving inputs and stored in the storage stage. Through the use of a corresponding compression method, the required transmission capacity between image signal source and center can, on the one hand, be further reduced and the storage space available through the storage stage can, moreover, be minimized.

A video signal obtained from compressed image signals can thus likewise be transmitted in compressed manner. In just the same way it is, however, also possible to provide a decompression stage for the produced video signal in the apparatus of the invention, with the video signal then being transmitted decompressed.

It is particularly preferred when a switching stage for the alternating connection of the receiving inputs with different image signal sources is additionally provided in the apparatus of the invention. In this way a situation is achieved in which the number of the image signal sources coming into use in total is not restricted to the number of the receiving inputs provided in the apparatus, since the receiving inputs that are provided can be alternatingly connected to different image signal sources by means of the switching stage. It is thus straightforwardly possible, for example with 30 receiving inputs, which can be connected together to the said groups as required, to regularly interrogate a number of, for example, 60 or more image signal sources and in this manner to generate a video signal which consists of sequential time segments which originate from 60 or correspondingly more differing image signal sources.

It is preferred when the said switching stage is formed as a selection stage, and the addresses or telephone numbers of different image signal sources present at different geographical locations can be stored in the switching stage.

In order to achieve a cyclical and regular transmission of the image signals originating from the different image signal sources in the form of a respective time segment of the video signal, the different image signal sources can be selected in a repeating sequence by the switching stage. A dialing of a continuously changing sequence is, however, likewise possible, and in this case account can be taken of the eventually timewise changing demands and/or the respectively available transmission capacities to the various image signal sources.

The sequential time segments of the different image signals forming the video signal can respectively have the same or mutually differing time durations. The time duration can, for example, amount to between 15 s and 5 min, in particular to a minute.

It is advantageous when a buffer region, for which the minimum size can, for example, correspond to the shortest time duration, is provided in the storage stage of the apparatus of the invention. This buffer region is provided in addition to the respective storage region, which is in any event necessary for the intermediate storage of the received image signals, so that this additional buffer region can, for example, always be exploited when disturbances occur in the transmission of image signals from the image signal sources to the center. In the case of a disturbance of this kind, an image signal can be read out from the buffer region and transmitted, with an attempt being made during this transmission time to remedy the damage which has arisen.

The size of the buffer region can be variably adjustable in dependence on the operating data of the apparatus. If, for example, it turns out that the apparatus runs free of disturbance over a long time, the buffer region can be made smaller; if disturbances frequently occur, it can be made larger.

The storage stage provided in the apparatus of the invention can, for example, be operated in accordance with the FIFO principle, with it also being possible to incorporate the possibly present buffer region described above into this FIFO principle. The use of the said principle for the reading into and reading out of the storage stage causes a situation in which only the shortest possible time elapses between the recording of an image signal through an image signal source and the transmission of the image signal as video signal. The incorporation of the buffer region into the FIFO principle, moreover, ensures that the content of the buffer region is continually changed and kept up to date, so that in the case of a disturbance no outdated image signals have to be transmitted.

It is furthermore advantageous when an initiation stage is provided for the transmission of a start signal to the image signal sources. By means of this trigger stage it can be ensured that an image signal source starts with the recording of an image signal at a respectively desired point in time. The transmission of the recorded image signal to the apparatus of the invention can already be caused during the recording of an image signal of a predetermined time duration. In this manner a situation is achieved in which only a minimum time duration elapses between the transmission of the start signal to an image signal source and the start of the transmission of the image signal of this image signal source to the respective receiving input of the apparatus of the invention.

In just the same way it is, however, also possible that the start signal initiates the transmission of an already recorded image signed to the apparatus of the invention.

Finally, it is preferred, in accordance with the invention, when a control stage is provided for the transmission of control signals to the image signal sources. Setting values for the motion, for the image section, for the aperture diaphragm and/or for the focus of a camera provided in an image signal source can be transmitted by means of such a control stage, so that ultimately the operation of all image signal sources can be completely controlled by the center, i.e. by the apparatus of the invention.

In the context of the invention protection is also claimed for an image signal source for the coupling with an apparatus (1) in accordance with one of the preceding claims comprising a camera which delivers an image signal with a quality corresponding at least to the bit rate x, a memory for the storage of an image signal of a predetermined duration, a receiving connection for the reception of control signals, and a transmitting connection for the reading out and transmission of a stored image signal with a bit rate smaller than the bit rate x.

An image signal source of this kind is suited to recording an image signal of an adequate quality which corresponds to the bit rate x, to record it and to transmit it to a center in dependence on the reception of control signals with a slow bit rate. Moreover, the image signal source can have input means for data, in particular text data, to be jointly transmitted with the image signal.

It is preferred when a storage region for camera operating parameters received via the receiving connection, such as for example camera movement, image section, aperture and/or focus, is provided in the image signal source. With the provision of such a storage region, the set parameters can be variably adjusted, depending on the requirement, and can be matched to the respectively prevailing conditions.

The following possibilities exist, for example, in accordance with the invention, for the recording and/or the transmission of a recorded image signal.

The recording of an image signal can be initiated by the center through the transmission of a control or start signal to the image signal source. As a consequence, either the apparatus built up between the image signal source and the center can remain in existence during the recording of the image signal, and the transmission of the recorded image signal can already take place during the recording, or the built up connection between the image signal source and center can also be interrupted during the period of the recording. In the last named case, after the recording has taken place, either the image signal source can transmit a control signal to the center, or the center can transmit a control signal to the image signal source, which initiates the transmission of the recorded image signal from the image signal source to the center.

Alternatively, it is possible that the image signal source records an image signal in accordance with a fixedly preset time scheme stored in the image signal source. The transmission of an image signal recorded in this way can either be initiated in that the image signal source transmits a control signal to the center, or in that the center transmits a control signal of this kind to the image signal source. In the last named case it is of advantage when the center has information concerning the time scheme stored in the image signal source.

Likewise it is possible that the recording of an image signal is initiated by a sensor coupled to the camera. In this way any desired types of sensors can come into use. For example, the use of light sensors, movement sensors, light barriers, temperature sensors, wind measuring devices or other weather data measuring devices or the like can be sensible. Through the use of such sensors a situation can be achieved in which the camera only then records an image signal when an event which is actually of interest to a viewer occurs, for example, a determination can be made by means of a movement sensor when a bird hatches from an egg or an animal appears at a feeding point.

The recording of an image signal can take place independent timewise from the transmission of the image signal to the center, if corresponding storage possibilities are provided in the image signal source. In this case the stored image signal can be called up by the center precisely when it is required there—independently of the point in time of the recording.

In particular it is possible to store in the image signal source a plurality of image signals, preferably in accordance with a predetermined ordering principle. Through this supply of the image signals, possible system dropouts on behalf of the image signal source or on behalf of the center can then be compensated.

The image signal source of the invention can, furthermore, be operatable in an adjustment mode in which it is controllable by control signals from a center and a transmission of the image signals delivered by the camera to the center can be simultaneously produced, which takes place with only a few seconds delay, i.e. almost in real time. This transmission is then preferably conducted with a reduced image quality, which lies below the customary transmission quality of television signals, in particular with the bit rate y. In this case one can actually see the image recorded by the camera of the image signal source quasi live at the center, with quality penalties naturally occurring with respect to the image received by the center, which are, however, non-damaging since the transmission of the image signal only serves for adjustment purposes.

Finally, it is also sensible to so design the center and the image signal source that a remote servicing of the image signal source can be carried out on behalf of the center. In the context of the remote servicing, a time comparison, a system check and/or am interrogation of the state of the image signal source can in particular take place.

Further preferred embodiments of the apparatus of the invention and also of the image signal source of the invention are set forth in the subordinate claims.

The apparatuses of the invention can not only be exploited for the production and transmission of a video signal. In just the same way it is possible to collect the data of such a signal solely in an apparatus in accordance with the invention, to keep it up to date and to make it available on request. Conceivable are, for example, applications in which a travel office, a hotel or also a television institute accesses the apparatus of the invention via a selection line or a direct line, or also via Internet, and intentionally calls up a single image signal against the payment of fees. This can, for example, be sensible if a travel agency wishes to show a customer the type of weather which is currently prevailing at a specific holiday location. The image signal of precisely this location is then called up, and the FIFO principle which is used with respect to the storage stage present in the apparatus of the invention ensures that the most up to date image signal possible is made available to the travel office. In just the same way a television company can, for example, call up the image signal of a specific capital city and use it as a background for a speaker reporting on the corresponding city.

Figure 2:
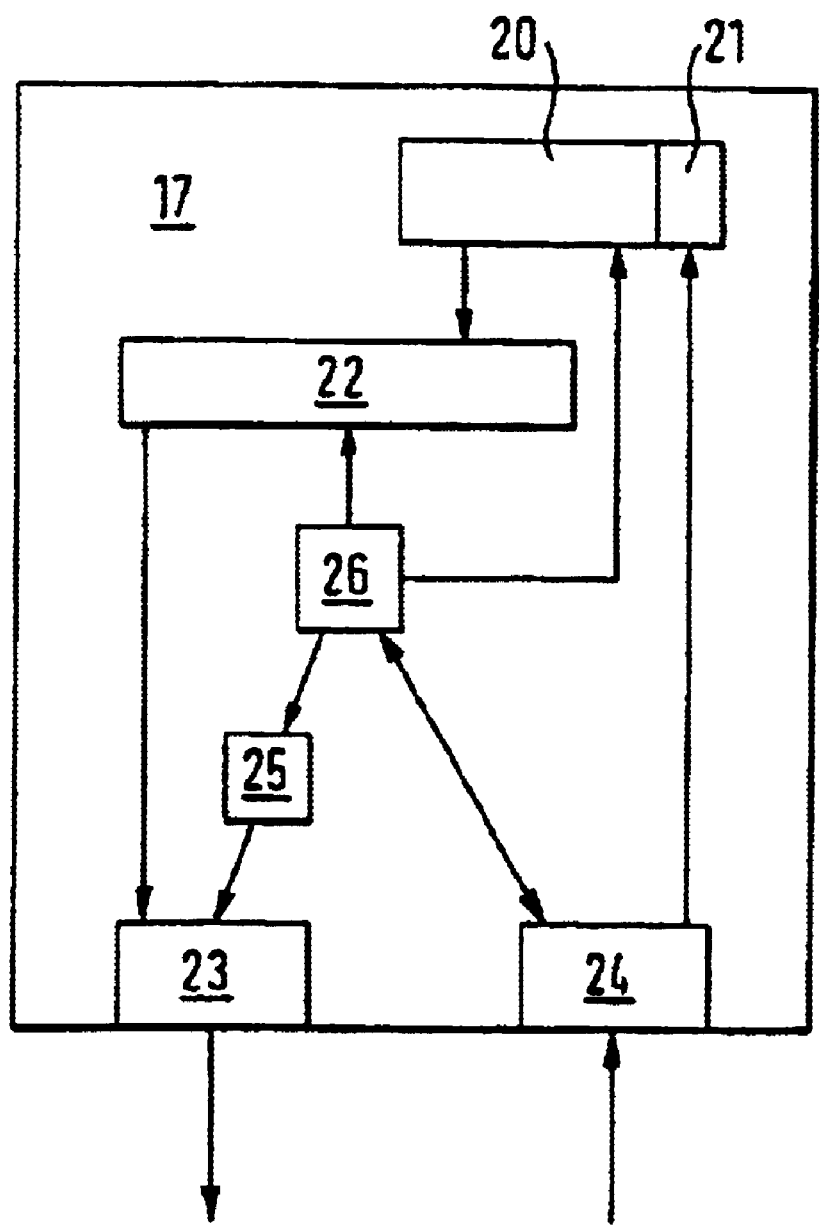

The invention will be described in the following with reference to an embodiment and to the drawings, in which are shown:

FIG. 1 a block circuit diagram of an apparatus in accordance with the invention for the generation of a video signal, FIG. 2 a block circuit diagram of an image signal source for the coupling with an apparatus in accordance with FIG. 1, and FIG. 3 a time diagram which illustrates the time changing occupation of the receiving inputs with different image signals.

The apparatus 1 shown in FIG. 1 has six receiving inputs 2 and also an additional receiving input 3. The receiving inputs 2, 3 form the receiving stage 4, via which the apparatus 1 can be coupled, for example, with selection and/or direct lines, for example with telephone lines or Internet lines.

All receiving inputs 2, 3 are connected to a storage stage 5, which has, in addition to a normal storage region 6, in addition also a buffer region 7.

Both the normal storage region 6 and also the buffer region 7 are suitable to store data and signals which are received from the receiving stage 4.

The data which can be stored in the storage stage 5 can be directed to a data callup stage 8, which puts together from the data stored in the storage stage 5 a digital video signal which is ultimately to be transmitted, which will be explained in the following.

The video signal produced by the data callup stage 8 is transmitted to the transmitter stage 9, which is suitable for the transmission by wire or for wireless transmission of the video signal via a transmission line 10.

In the event that the data callup stage produces a compressed video signal, or in the event that the receiving stage already receives compressed signals, which can then also lead to the production of a compressed video signal in the data callup stage 8, the compressed video signal can be transmitted to the transmitter stage 9—if required also via a decompression stage 11—so that a decompressed video signal can ultimately be transmitted by the transmitter stage 9.

Furthermore, a switching stage 12 is provided in the apparatus 1, which is in particular formed as a dialing stage. In the switching stage 12 a storage region 13 is provided for a plurality of addresses or telephone numbers. By means of the switching stage 12 and the addresses stored therein, a connection of the receiving stage 4 to subscribers remote from the apparatus 1 can be produced, which will likewise be explained in more detail in the following.

The receiving stage 4, the storage stage 5, the data callup stage 8, the transmitter stage 9, the decompression stage 11 and also the switching stage 12 are controlled by a microprocessor 14 which controls all events in the apparatus 1.

The receiving inputs are respectively connected via data lines 15 to one or more external relay stages 16, which can produce connections to a plurality of external image signal sources 17, for example 60 external image signal sources 17, if the address of one such image signal source 17 is selected by means of the switching stage 12. The connection of a receiving input 2 and an image signal source 17 can take place via a group of a plurality of data lines 15, so that signals from the image signal source 17 can be transmitted in parallel via a plurality of lines 15 to the respective receiving input 2.

The additional receiving input 3 is connected via a direct line 18 to a further image signal source 19. The image signals or data delivered by the image signal source 19 can be transferred via the direct line 18 and the additional receiving input 3 into the storage stage 6 or direct to the transmission stage 9.

FIG. 2 shows an image signal source 17 in accordance with FIG. 1.

The image signal source 17 includes a camera 20, with a storage region 21 being provided in the camera arrangement, in which camera operating parameters, such as for example camera movement, image section, aperture and/or focus, can be stored.

The image signals delivered by the camera 20 can be deposited in a memory 22, and can be transferred from there to a transmitter connection 23. The transmitter connection 23 is connected if required to a relay point 16 in accordance with FIG. 1.

Furthermore, a receiving connection 24 is provided in the image signal source 17 and can, for example, contain control or start signals of an apparatus 1 in accordance with FIG. 1. In particular the receiving connection 24 can receive a start signal for the initiation of the recording of an image sequence or can receive the already mentioned camera operating parameters.

By means of a dialing or selecting stage 25, the transmitter connection 23 can be connected, if required, via the relay point 16 to an apparatus 1, so that not only the apparatus 1 can call up an image source 17, cut rather an image signal source 17 can call up the apparatus 1.

Camera 2, memory 22, transmitter connection 23, receiving connection 24 and also dialing stage 25 are controlled by a microprocessor 26.

The function and the cooperation of the apparatus 1 of FIG. 1 of and the image signal source 17 of FIG. 2 will be explained in the following:

At a time $t_i$ the address of a first image signal source 17 is dialed via the dialing stage 12 and a start signal is transmitted to the relevant image signal source 17 via this connection which has been produced. The image signal source 17 receives the start signal via the receiving connection 24 and causes an image sequence of the duration $t_i$ by means of a camera 20 in dependence on this reception.

The connection between the apparatus 1 and the image signal source 17 can be interrupted again directly after reception of the start signal by the image signal source 17;

The image sequence recorded by the camera 20 is stored in the memory 22 of the im age signal source 17. As soon as the image sequence is fully stored in the memory 22, the apparatus 1 is called up by means of the dialing stage 25 of the image signal source 17 via the transmitter connection 23, and a connection is produced between the first image signal source 17 and the first receiving input 2 of the apparatus 1. After the production of this connection, the image signal stored in the memory 22 is transmitted to the first receiving input 2 with a data rate y. The data rate y is in this respect smaller than that data rate with which the recorded image sequence is transmitted by the camera 20 to the memory 22.

Alternatively, the said transmission can also already be initiated during the recording, so that it is not necessary that the apparatus 1 is called up by means of the dialing stage 25.

At a time $t_2$, which preferably lies after the time point $t_1$ by the time interval $t_i$, a further start signal is transmitted by means of the dialing stage 12 to a second image signal source 17, whereupon the process already described above now takes place with this image signal source 17 and the second receiving input 2. At the times $t_3$, $t_4$, $t_5$ and $t_6$ one proceeds in just the same way with the third, fourth, fifth and sixth receiving input 2 and also with the third, fourth, fifth and sixth image signal source 17.

As soon as the image sequence recorded by the first image signal source 17 has been transmitted via the data line 15 to the first receiving input 2, the transmission of an image sequence recorded by a seventh image signal source 17 takes place via this first receiving input. In order to enable this transmission, a start signal was previously timely sent from the apparatus 1 to the seventh image signal source 17.

At a corresponding time offset, a transmission of image sequences then takes place from the eighth, ninth, tenth, eleventh and twelfth image signal source 17 to the second, third, fourth, fifth and sixth receiving input 2.

In this manner, sixty image signal sources 17 can, for example, be cyclically interrogated, and in each case a connection to six of these sixty image signal sources simultaneously exists via the sixth receiving inputs 2, but offset with time overlap. Thus, the simultaneous, time overlapped, offset transmission of six image sequences always takes place from six different image signal sources 17 to the six receiving inputs 2, with the transmission of image sequences of two sequentially dialed image signal sources taking place with respective time offset by the time interval $t_i$.

Alternatively, it is, however, also possible to transmit the image sequences of the different image signal sources acyclically and irregularly and in this connection to take account of the respectively available line capacities which change with time. This will subsequently be explained with reference to FIG. 3.

The received image sequences are deposited by the receiving inputs 2 in the storage stage 5, where they are then called up by the data callup stage 8. The data callup stage 8 serves to ensure that the individual image sequences are put together timewise after one another and transmitted with a high bit rate x to the transmitter stage 9. The transmitter stage 9 is then in a position of being able to transmit the finished video signal with the generating bit rate x or also an analogue signal with a quality corresponding to the bit rate x.

In order to enable the generation of a continuous video signal which consist exclusively of image sequencer delivered from the image signal sources 17, it must be ensured that the total transmission capacity of all lines 15 which lead to the receiving inputs 2 is at least as high as the generating bit rate x, with which the video signal is transmitted by the transmitter stage 9. A correspondingly smaller capacity on the lines 15 is naturally possible when the video signal does not consist exclusively of signals of the image signal sources 17, but rather when, for example, sequences are inserted from further sources, for example from a suitable memory (tape, hard disc etc.). These sequences are then preferably made available with the generating bit rate x.

In the event of the occurrence of disturbances, the storage stage 5 is expanded by a buffer region 7, in which one or ore reserve image sequences can be deposited, which can be called up if an error occurs in the transmission between image signal sources 17 and apparatus 1. The use of the buffer region 7 can in this respect be variable, as already explained.

The additional receiving input 3 provided in addition to the receiving inputs 2 enters into operation, for example, when a larger disturbance occurs, since in this case the image signal delivered from the image signal source 19 via the direct line 18 is transmitted directly by the transmitter stage 9. In order to ensure adequate quality here, the transmission capacity of the direct line 18 must correspond at least substantially to the generating bit rate x. In just the same way it is, however, also possible to exploit the receiving input 3 continually, i.e. also with normal operation of the apparatus, and to include the image signal received via this receiving input 3 into the normal cycle of the video signal.

FIG. 3 illustrates with respect to a time diagram the manner in which, for example, 15 receiving inputs 2 and/or 3 of an apparatus in accordance with the invention can be exploited for the simultaneously time overlapping offset transmission of different image signals A to R, with a time interval extending from the time point to the time point $t_{16}$ being shown. The receiving inputs 2 and/or 3 can be operated with bit rates or transmission speeds different from one another.

Starting with the time to, the image signal A is received via the receiving inputs 1, 2 and 3, the image signal B is received via the receiving input 4, the image signal C is received via the receiving inputs 5 and 6, the image signal D is received via the receiving inputs 7 to 12, and the image signal E is received via the receiving inputs 13 and 14. This signifies that, for example, the image signal D can be received in parallel via six different receiving inputs in a relatively short time, whereas the serial reception of the image signal B via only a single receiving input takes a longer time.

The decision as to how many receiving inputs are used for the reception of an individual image signal can be taken in dependence on the respectively prevailing transmission lines between the center and the respective image signal sources and also in dependence on the respectively arising costs. It is only necessary to ensure that so much data of an image signal is received that the image signal can be transmitted over a predetermined time duration $t_i$ as a video signal with adequate quality. The transmission durations $t_i$, which an image signal respectively takes up in the transmitted video signal, can be the same as one another or can differ from one another.

After the reception of the image signal D is concluded after the time $t_i$, the receiving inputs 7 to 12 are available for the reception of further image signals. Accordingly, the reception of the image signal F via the receiving inputs 7 and 8 and the reception of the image signal G via the receiving inputs 9 to 12 now begins.

Since the image signal A was fully received at the time $t_2$, the serial reception of the image signal H starts at the time $t_2$ via the receiving input 1.

For the reception of an image signal I, it can, for example, be most economical when the transmission takes place in parallel via five receiving inputs. In this case the microprocessor controls the apparatus of the invention in such a way that it waits until five parallel receiving inputs are available. This is the case at the time $t_3$ in FIG. 3, at which the transmission of the image signal I via the receiving inputs 2, 3, 13, 14 and 15 then begins. In order to have these five receiving inputs available, the operation of the receiving inputs 2 and 3 is interrupted for the time interval between $t_2$ and $t_3$.

At the time $t_4$ the transmission of the image signal I has been concluded, whereupon the transmission of the image signal J via the receiving inputs 2, 3 and 13 can start. At the same time the transmission of the image signal K via the receiving inputs 14 and 15 starts at the time $t_4$.

The transmission of the image signals L to R takes place in a corresponding manner in accordance with the illustration in FIG. 3.

At this point it should be noted that one and the same image signal can be received at different times via different numbers of receiving inputs, depending on the number of the lines which are currently available, or also in accordance with the respectively applicable transmission charges (day and night tariff). It is, for example, possible to start the transmission of a new sequence of the image signal D at the time $T_{16}$ via only four receiving inputs, with the transmission duration then naturally being longer than the time interval between $T_0$ and $T_1$.

In each case the precise sequence of the image signals transmitted from different image signal sources can be dynamically specified during the operation of the apparatus by means of a suitable computer program, with the respectively applicable transmission tariffs and also the transmission lines that are respectively available being taken into account. In this connection it can be ensured, by means of a corresponding program, that the image signals of image signal sources are received in a cyclical sequence which is as regular as possible and are made available as a video signal. The said cyclical sequence can, however, also be intentionally interrupted when, for example, an actual event is to be transmitted from a specific geographic location. The transmission of this actual event can then bring about a new calculation of the total sequence or of the predetermined sequence.

What is claimed is:

1. An apparatus for generating a video signal of a quality corresponding to a real time video bit rate (x) comprising:

a receiver stage having a plurality n of receiving inputs for the simultaneous reception of different image signals Yi, at least one of which has a receiving bit rate $Y_{Yi}$ lower than the real time video bit rate x, wherein the different image signals $Y_i$ are originally generated at different spaced apart geographical locations and transmitted over relatively long distance transmission paths;

a storage stage for the intermediate storage of the received image signals $Y_i$;

a final data retrieval stage for the reading out of the intermediately stored image signals $Y_i$ at the real time video bit rate x as sequential time sections of different image signals $Y_i$ forming the video signal from time durations $t_i$ of newly generated parts of a single and complete video signal by sequentially putting together the retrieved image signals for the generation of the video signal which is composed of successive time segments of the different image signals $Y_i$, wherein the video signal is generated in a common receiver station at a receiver site of the long distance transmission paths;

wherein the sum of receiving bit rates $y_i$ of the simultaneously received image signals $Y_i$ is greater than or the same as the real time video bit rate x, at least in time average, with receiving bit rates $y_i$ which differ from one another in particular being associated with different receiving inputs.

2. An apparatus in accordance with claim 1, wherein a number $m_i$ of receiving inputs can be switched together to a group for the reception of an individual image signal $Y_i$ with $1 \leq m_i \leq n$.

3. An apparatus in accordance with claim 2, wherein data of at least one image signal $Y_i$ can be received in parallel by a group of at least two switched together receiving inputs.

4. An apparatus in accordance with claim 2, wherein the numbers $m_i$ of the receiving inputs which are in each case switched together to a group for the transmission of the individual image signals $Y_i$ differ from one another and are adaptable to the respectively existing transmission capacities.

5. An apparatus in accordance with claim 2, wherein the number $m_i$ of the receiving inputs which are switched together to a group for the transmission of an individual image signal $Y_i$ is variable time-wise and adaptable to the requirements and/or transmission capacities existing at a respective time point.

6. An apparatus in accordance with claim 1, further comprising a transmission stage for transmission by wire or wireless of a digital video signal or of an analog video signal obtained from a digital video signal.

7. An apparatus in accordance with claim 1, wherein the n receiving inputs are connectable to selection lines and/or direct lines, in particular to ISDN lines or lines operated in accordance with another customary protocol.

8. An apparatus in accordance with claim 7, wherein n is 60 receiving inputs respectively connected to an ISDN data line(B-channel).

9. An apparatus in accordance with claim 1, wherein image signals $Y_i$ are received in compressed form and selectively stored in the storage stage.

10. An apparatus in accordance with claim 9, further comprising a decompression stage for generating the video signals.

11. An apparatus in accordance with claim 1, further comprising a switching stage for the alternating connection of the receiving inputs to different image signal sources.

12. An apparatus in accordance with claim 11, wherein the switching stage is formed as a selecting stage.

13. An apparatus in accordance with claim 12, wherein the addresses of k different image signal sources located at different geographical locations are selectively stored in the switching stage.

14. An apparatus in accordance with claim 13, wherein k is larger than the number of the simultaneously receivable image signals $Y_i$.

15. An apparatus in accordance with claim 13, wherein the k different image signal sources are selectable by the switching stage in a variable sequence adaptable to respectively available line capacities and/or demands.

16. An apparatus in accordance with claim 13, wherein the k different image signal sources are selectable by the switching stage in a repeating sequence.

17. An apparatus in accordance with claim 1, wherein the time durations $t_i$ range between 15 s and 5 min, in particular to approximately 1 min.

18. An apparatus in accordance with claim 1, further comprising a buffer region in the storage stage at least as large as the shortest time duration $t_i$.

19. An apparatus in accordance with claim 18, wherein the buffer region size is variably adjustable in response to operating data of the apparatus.

20. An apparatus in accordance with claim 1, wherein the storage stage is a FIFO storage.

21. An apparatus in accordance with claim 1, further comprising at least one additional receiving input selectively coupled to an image signal source in normal operation and/or in exceptional cases via a direct line.

22. An apparatus in accordance with claim 21, wherein the transmission capacity of the direct line corresponds to the real time video bit rate x.

23. An apparatus in accordance with claim 1, further comprising a trigger stage for the transmission of a start signal to the image signal source and for causing the recording of an image signal $Y_i$ and/or the transmission of a received image signal $Y_i$ to a receiving input.

24. An apparatus in accordance with claim 23, wherein the start of the transmission of the image signal $Y_i$ of an image signal source to the respective receiving input can be initiated during the recording of the image signal $Y_i$ which takes place through the image signal source or thereafter.

25. An apparatus in accordance with claim 1, further comprising a control stage for the transmission of control signals to the image signal sources.

26. An apparatus in accordance with claim 25, wherein the control signals include setting values for the movement, the image section, the aperture and/or the focus of a camera provided in an image signal source.

27. An image signal source for the coupling with an apparatus as in claim 1 comprising
  a camera delivering an image signal $Y_i$ with a quality corresponding at least to the real time video bit rate x,
  a memory for the storage of an image signal $Y_i$ of the duration $t_i$,
  a receiving connection for the reception of control signals, and
  a transmitting connection for the reading out and transmission of a stored image signal $Y_i$ with a bit rate $y_i$ smaller than the real time video bit rate x.

28. An image signal source in accordance with claim 27, further comprising a memory storing camera operating parameters received from the receiving connection, said camera operating parameters selectively including camera movement, image section, aperture and/or focus.

29. An image signal source in accordance with claim 27, wherein the recording of an image signal $Y_i$ is selectively triggerable through the reception of a control signal and/or in a predetermined time grid.

30. An image signal source in accordance with claim 27, wherein the recording of an image signal $Y_i$ is selectively triggerable by a light sensor, a movement sensor, a light barrier, a temperature sensor, a wind measuring device or the like coupled to the camera.

31. An image signal source in accordance with claim 27, further comprising a selecting stage for selectively connecting the signal source to an apparatus as in claim 1.

32. An image signal source in accordance with claim 31, wherein the connection is selectively made prior to complete storage of an image signal $Y_i$ of the duration $t_i$.

33. An image signal source in accordance with claim 27, controllable by control signals from an apparatus as in claim 1 and simultaneously providing image signals $Y_i$ delivered by the camera to the apparatus.

34. An image signal source in accordance with claim 33, wherein said simultaneously provided image signals are provided with an image quality beneath the quality of normal television signals and at, a bit rate which is smaller than the real time video bit rate x.

* * * * *